United States Patent
Koshihara et al.

(10) Patent No.: US 10,859,507 B2
(45) Date of Patent: Dec. 8, 2020

(54) SURFACE DEFECT INSPECTION METHOD AND SURFACE DEFECT INSPECTION APPARATUS

(71) Applicant: JFE Steel Corporation, Tokyo (JP)

(72) Inventors: Takahiro Koshihara, Tokyo (JP); Yoshiyuki Umegaki, Tokyo (JP); Takahiko Oshige, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 16/495,228

(22) PCT Filed: Feb. 28, 2018

(86) PCT No.: PCT/JP2018/007418
§ 371 (c)(1),
(2) Date: Sep. 18, 2019

(87) PCT Pub. No.: WO2018/173660
PCT Pub. Date: Sep. 27, 2018

(65) Prior Publication Data
US 2020/0025690 A1  Jan. 23, 2020

(30) Foreign Application Priority Data
Mar. 21, 2017  (JP) ................. 2017-054426

(51) Int. Cl.
*G01N 21/00* (2006.01)
*G01N 21/898* (2006.01)
*G01N 21/88* (2006.01)

(52) U.S. Cl.
CPC ..... *G01N 21/8983* (2013.01); *G01N 21/8851* (2013.01)

(58) Field of Classification Search
CPC ........... G06T 7/001; G06T 2207/30148; G06T 7/0004; G06T 2207/30108;
(Continued)

(56) References Cited

U.S. PATENT DOCUMENTS

| 6,983,065 B1 | 1/2006 | Akgul et al. |
| 2003/0081215 A1 | 5/2003 | Kumar et al. |

(Continued)

FOREIGN PATENT DOCUMENTS

| JP | 2001255275 A | 9/2001 |
| JP | 2002195952 A | 7/2002 |

(Continued)

OTHER PUBLICATIONS

International Search Report and Written Opinion for International Application No. PCT/JP2018/007418, dated Apr. 10, 2018—5 pages.
(Continued)

*Primary Examiner* — Mesfin T Asfaw
(74) *Attorney, Agent, or Firm* — RatnerPrestia

(57) ABSTRACT

A surface defect inspection method includes: acquiring an original image by capturing an image of a subject of an inspection; generating texture feature images by applying a filtering process using spatial filters to the original image; generating a feature vector at each position of the original image, by extracting a value at a corresponding position from each of the texture feature images, for each of the positions of the original image; generating an abnormality level image representing an abnormality level for each position of the original image, by calculating, for each of the feature vectors, an abnormality level in a multi-dimensional distribution formed by the feature vectors; and detecting a part having the abnormality level that is higher than a predetermined level in the abnormality level image as a defect portion or a defect candidate portion.

17 Claims, 10 Drawing Sheets

(58) Field of Classification Search
CPC ........... G01N 21/9501; G01N 21/8851; G01N 21/956; G01N 2021/8887; G01N 21/95; G01N 21/8803; G01N 21/93; G01N 21/95607; G01N 2021/8822; G01N 2021/8825; G01N 2021/8861; G01N 21/94; G01N 21/95623; G01N 25/72; G01N 15/088; G01N 19/08; G01N 2021/1765; G01N 2021/8819; G01N 2021/8841; G01N 2021/8854; G01N 2021/8864; G01N 2021/8867; G01N 2021/888; G01N 2021/8924; G01N 2021/95615; G01N 21/15; G01N 21/9505; G01N 21/9515; G01N 21/954; G01N 2223/401; G01N 2223/6462; G01N 23/04; G01N 23/046; G01N 27/82; G01N 27/902; H01L 21/67288
See application file for complete search history.

(56) References Cited

U.S. PATENT DOCUMENTS

| | | | |
|---|---|---|---|
| 2013/0129188 A1* | 5/2013 | Zhang | G06T 7/0008 382/144 |
| 2015/0369752 A1 | 12/2015 | Honda et al. | |

FOREIGN PATENT DOCUMENTS

| | | |
|---|---|---|
| JP | 2004294202 A | 10/2004 |
| JP | 2008185395 A | 8/2008 |
| JP | 2013167596 A | 8/2013 |
| JP | 2014149177 A | 8/2014 |
| JP | 2015041164 A | 3/2015 |
| KR | 20110043033 A | 4/2011 |

OTHER PUBLICATIONS

Rallo et al., "Unsupervised Novelty Detection Using Gabor Filters for Defect Segmentation in Textures", J. Opt. Soc. Am. A., vol. 26, No. 9, Sep. 2009—pp. 1967-1776.
Ralló et al., "Unsupervised Novelty Detection Using Gabor Filters for Defect Segmentation in Textures", J. Opt. Soc. Am. A., vol. 26, No. 9, Sep. 2009—pp. 1967-1976.
Haiyong et al., "Strip Defect Detection Based on Gabor Wavelet and Weighted Mahalanobis Distance", Journal of Electronic Measurement and Instrument, 2015, pp. 786-793 with translation.
Jeon et al., "Detection of Scratch Defects on Slab Surface", Control automation and Systems (ICCAS) 011 11th International Conference on IEEE, 2011, pp. 1274-1278. 11th International onference on Control, Automation and Systems, 2011, pp. 1274-1278.
Medina et al., "Surface Defects Detection on Rolled Steel Strips by Gabor Filters", Proceedings of the Third International Conference on Computer Vision Theory and Applications, 2008, pp. 479-485.
Navarro et al., "Gaussian Wavelet Transform: Two Alternative Fast Implernntations for Images", Optical Processing, 1991, vol. 2, pp. 67-82.
Greenspan et al., "Overcomplete Ssteerble Pyramid Filters and Rotation Invariance", Proceedings of the Computer Society Conference on Computer Vision and Pattern Recognition, 1994, pp. 222-228.
Extended European Search Report for European Application No. 18770965.4, dated Mar. 9, 2020, 11 pages.
Yun et al., "Defects Detection of Billet Surface Using Optimized Gabor Filters", Proceedings of the 17th IFAC World Congress, 2008, vol. 41, No. 2, pp. 77-82.
Korean Notification of Reason for Refusal for Korean Application No. 10-2019-7027127, dated Aug. 11, 2020, with translation, 11 pages.

* cited by examiner

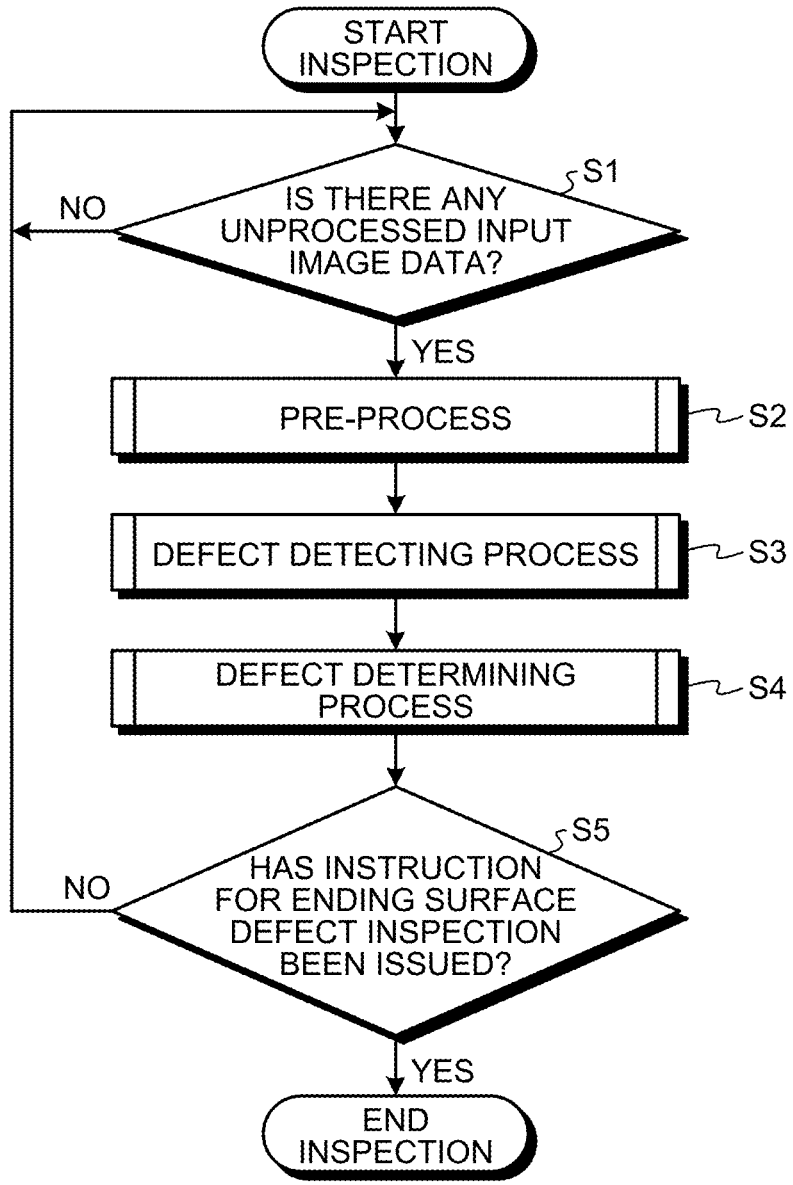

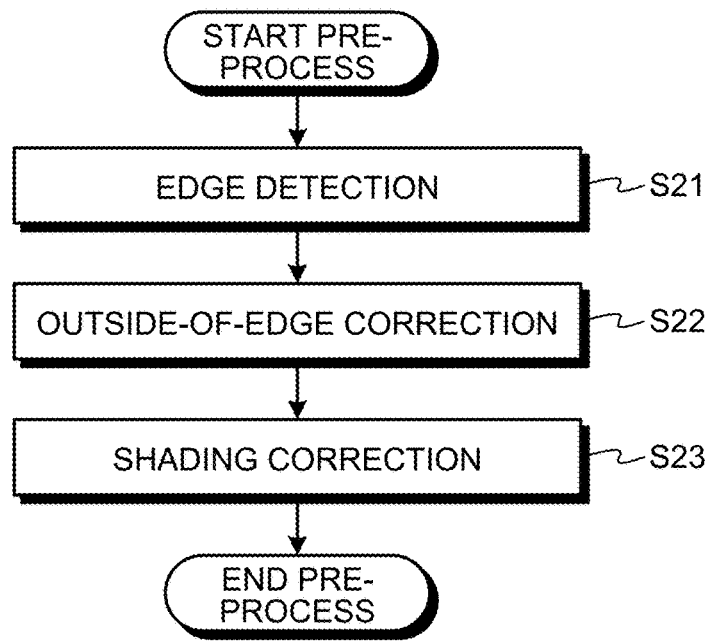
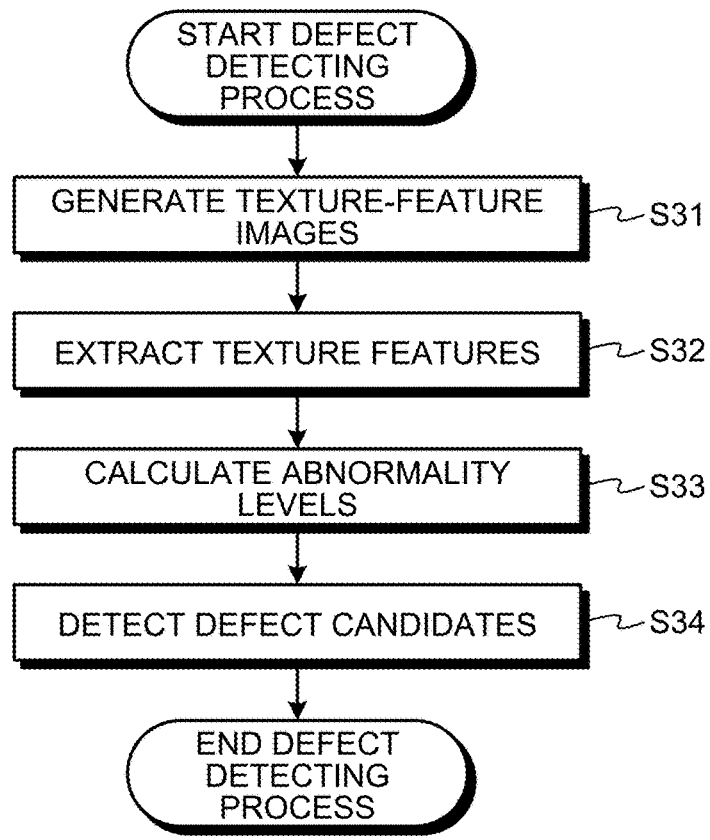

FIG.5
(a) REAL PART
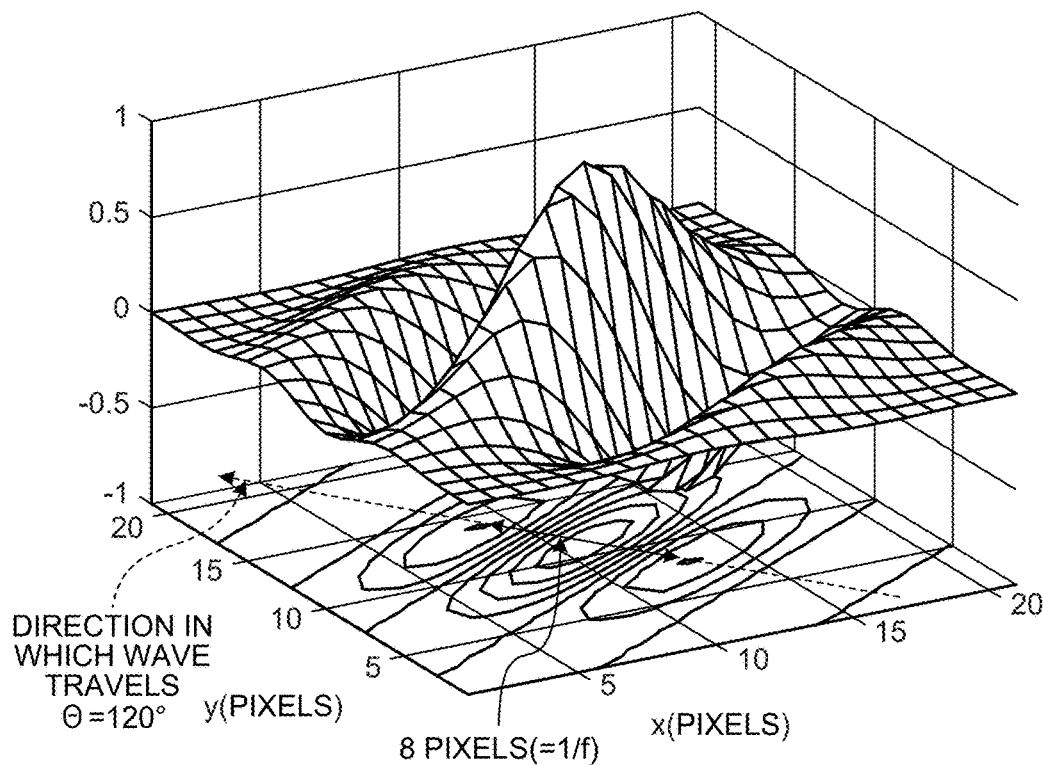
(b) IMAGINARY PART
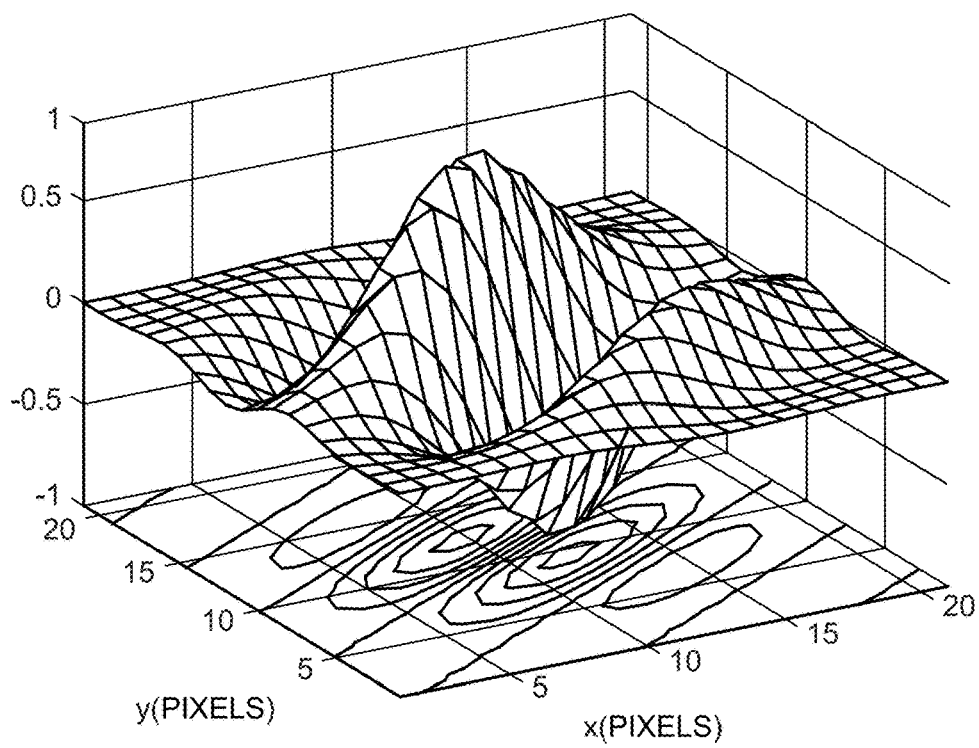

FIG.8
(a)
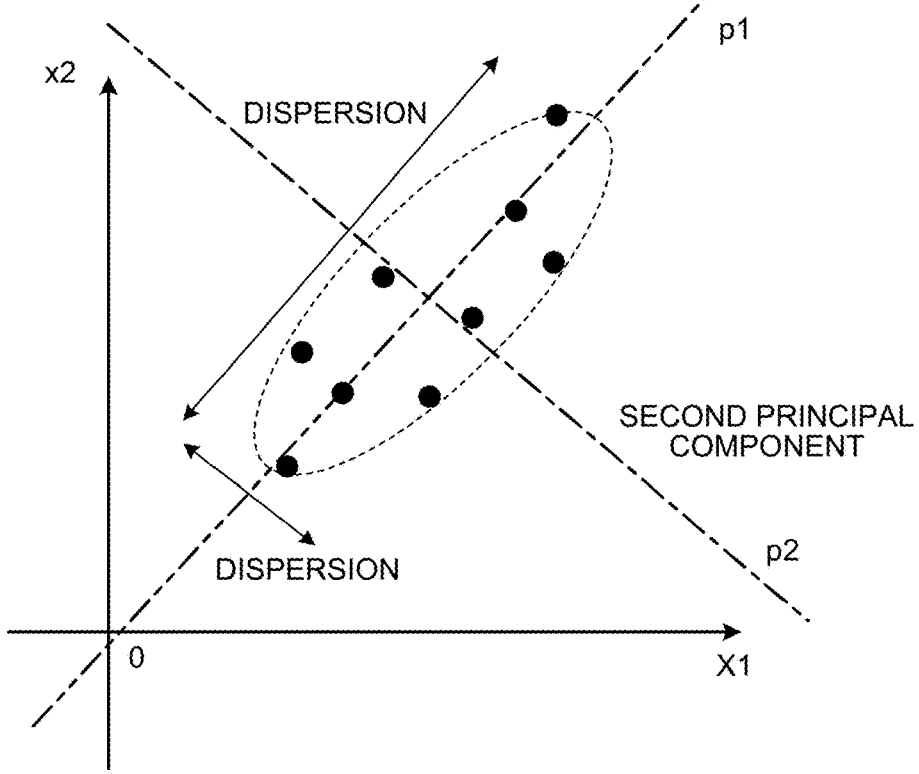
(b)
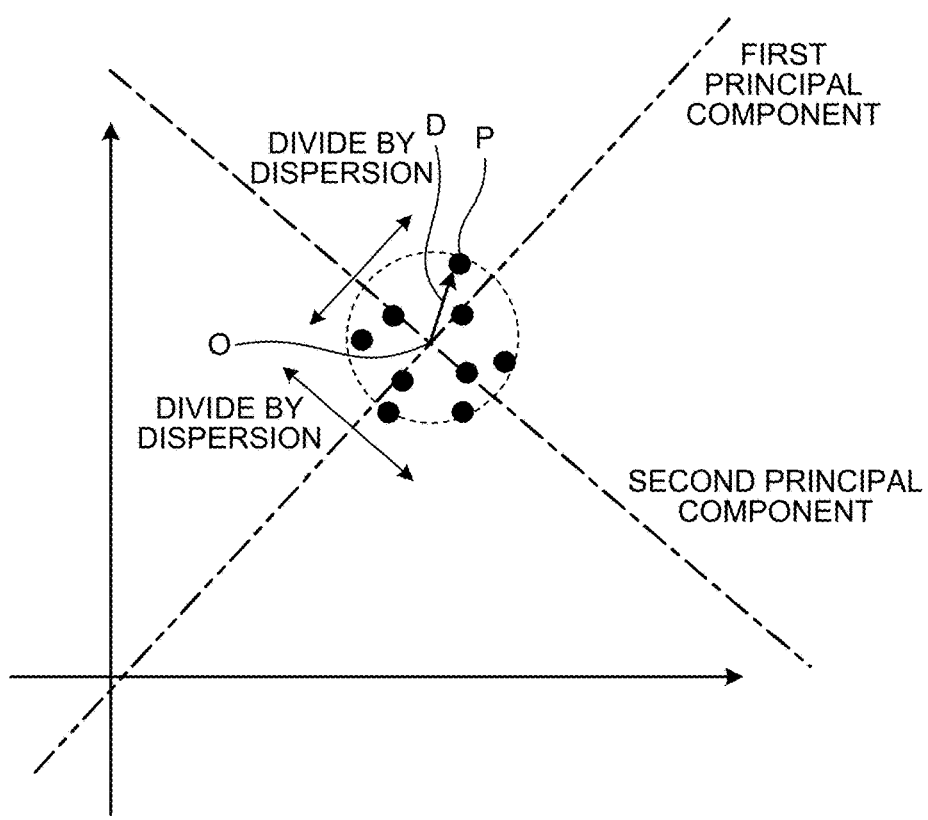

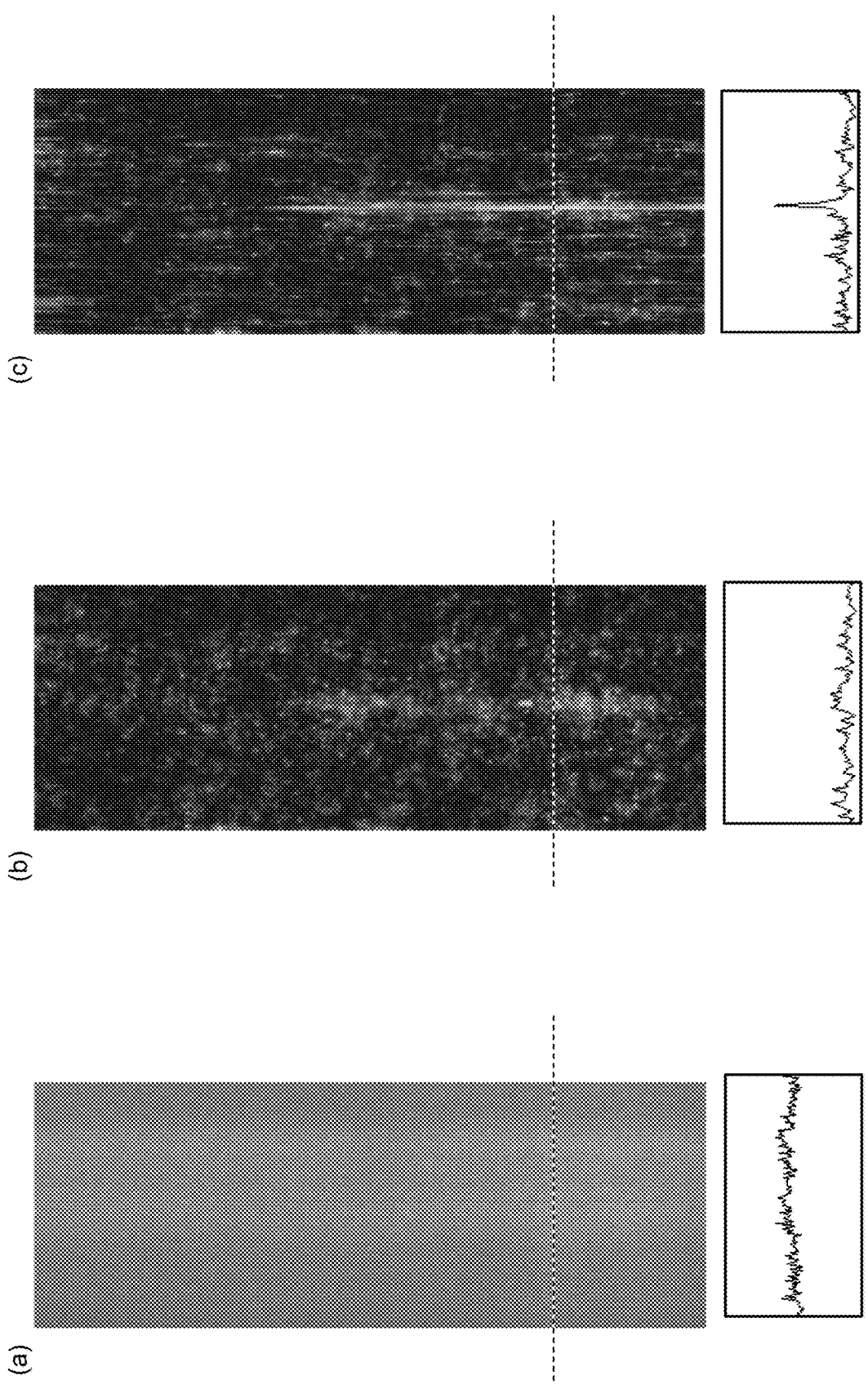

SURFACE DEFECT INSPECTION METHOD AND SURFACE DEFECT INSPECTION APPARATUS

CROSS REFERENCE TO RELATED APPLICATIONS

This is the U.S. National Phase application of PCT/JP2018/007418, filed Feb. 28, 2018, which claims priority to Japanese Patent Application No. 2017-054426, filed Mar. 21, 2017 the disclosures of each of these applications being incorporated herein by reference in their entireties for all purposes.

FIELD OF THE INVENTION

The present invention relates to a surface defect inspection method and a surface defect inspection apparatus.

BACKGROUND

Generally in the production lines of steel strips, surface defect inspections are carried out to ensure and to manage the surface quality of a product. Recently, to the process of the surface defect inspections, deployment of a surface defect inspection apparatus has come to be promoted, to achieve automation of the inspections and manpower reductions. Mainstream surface defect inspection apparatuses having recently come to be deployed are mainly those including an optical system and an image processing system using an illumination device and a camera. For such a conventional surface defect inspection apparatus, it has been a general practice to implement some devising for enhancing the contrast of a surface defect portion with respect to a normal portion, that is, some devising for increasing the signal-to-noise (S/N) ratio of an acquired image, to enable detections of surface defects that are the targets of inspection. Examples of such devising include an adjustment of the illumination device or the camera angle, and the use of an optical filter. However, because the surface defects of a steel strip have many different types, there are not too many optical systems that can achieve a high S/N ratio for every type of the surface defects.

In particular, some low-contrast surface defects without any prominent unevenness can be highly adverse, if such surface defects are long in the longitudinal direction of the steel strip. One example of such a surface defect is a mark-like scab defect formed on a hot-dip galvanized steel sheet. Formation of such a mark-like scab defects is triggered when a part called a scab portion has a different plating thickness or alloyed by a different degree, for example, compared with the base material. As a result, when the scab portion has a thicker plating, and protrudes from the base material, for example, and is then applied with temper-rolling, for example, the area of a tempered portion (the portion flattened by the tempering rollers) becomes larger than that of a not-tempered portion. By contrast, when the scab portion is recessed with respect to the base material, because the tempering rollers are not brought into contact with the scab portion, the not-tempered portion comes to occupy a major part of the area. Therefore, although the scab portion does not have any prominent unevenness compared with the base material, the ratio occupied by the tempered portion changes depending on such a unevenness, and causes the light-reflection characteristics to change. A change in the light-reflection characteristic then makes the appearance different, and results in a mark-like scab defect. Because such a mark-like scab defect is formed in a thin and elongated manner in the length direction of the hot-dip galvanized steel sheet, such a scab defect is an adverse defect from the viewpoint of appearance, although a unevenness is small. Therefore, such a mark-like scab defect needs to be detected.

One example of the surface defects other than those that are thin and long, but are difficult to detect is ash. Ash is formed on a hot-dip galvanized steel sheet. Ash is a surface defect that is formed when zinc vapor evaporated from a zinc pot becomes attached to an ancillary object of the pot, and a foreign substance formed by the zinc vapor falling and floating on the surface of the zinc bath becomes attached to the steel sheet. Ash is a mark-like surface defect without any prominent unevenness. Because an image of ash has a low contrast, it has been difficult for a conventional surface defect inspection apparatus to automatically detect such defects. However, because ash could be found as a defect in the appearance in the visual inspection carried out by a customer, ash is another surface defect that needs to be detected.

While both these types of surface defects need to be detected, it has been difficult to detect such surface defects using a conventional approach, because these defects are low-contrast defects. To detect these types of defects, additional devising in the image processing system has often been required to improve the S/N ratio. In a conventional image processing system of a steel strip surface defect inspecting apparatus, after correcting the luminance non-uniformity of an input image being resultant of illuminance non-uniformity that is attributable to an illumination device, detecting a surface defect portion by comparing the corrected image with a predetermined threshold is generally applied. Furthermore, when the normal portion has a high noise component, the S/N ratio of the surface defect portion is generally improved by reducing the noise by applying a low-pass filter, or emphasizing the edge of the surface defect portion by applying a differential filter, for example. However, many of these efforts are often only effective for certain types of surface defects, or under certain conditions. Particularly, when the surface defects that are long in the longitudinal direction mentioned above, and those that are short in the longitudinal direction (those that are small in size) are both present, a generally used filtering process has had a problem in that, by improving the S/N ratio for the surface defects that are long in the longitudinal direction to improve the detections sensitivity for such defects, the detection sensitivity for the surface defects that are short in the longitudinal direction deteriorates; and that, by improving the detection sensitivity for the surface defects that are short in the longitudinal direction, the detection sensitivity for the surface defects that are long in the longitudinal direction deteriorates. In this manner, it has been difficult to improve the S/N ratio for both of these types of surface defects at the same time.

Non Patent Literature 1 discloses a surface defect inspection method that uses a Gabor filter (Gabor wavelet). The method disclosed in Non Patent Literature 1 includes applying a Gabor wavelet to an image to be inspected, and carrying out a statistical analysis of the resultant wavelet coefficients; calculating (estimating) a distribution of wavelet coefficients acquired from a background texture without any defect; automatically determining a threshold for wavelet coefficients based on the calculated (estimated) distribution; and generating a binary image separating a surface defect portion from the background, by combining the results of applying the threshold to the wavelet coefficients (images). The method disclosed in Non Patent Literature 1 is also applicable to a surface having a periodic background, e.g., a piece of cloth, as well as to a surface having a random and non-periodic background.

Patent Literature

Non Patent Literature 1: Rallo et al. "Unsupervised novelty detection using Gabor filters for defect segmentation in textures", J. Opt. Soc. Am. A, Opt. Image. Sci. Vis., 2009, September; 26(9):1967-76.

SUMMARY OF THE INVENTION

With the conventional surface defect inspection method based on a simple comparison between an image against a threshold, if the S/N ratio is low, a surface defect signal cannot be separated from noise. In other words, such a method has a dilemma in detecting a noise erroneously in an attempt for detecting a surface defect, while falling incapable of a surface defect by attempting to avoid erroneous noise detections. Countermeasures such as the use of a low-pass filter also have had a problem in that, while such countermeasures may be effective for the surface defects having a certain shape or a certain background (texture), they are not capable of detecting surface defects having another shape or background. The surface defect inspection method disclosed in Non Patent Literature 1 has had a problem in that it is not quite capable of detecting a linear surface defect that is thin and long in the length direction of a steel strip, despite such a surface defect is often found on a steel strip product. FIG. 12(a) illustrates an example of an image of a linear surface defect on a steel strip, and a luminance profile across the broken line on the image, and FIG. 12(b) illustrates an image of the surface defect illustrated in FIG. 12(a) detected using the surface defect inspection method disclosed in Non Patent Literature 1, and a luminance profile across the broken line on the image. As illustrated in FIG. 12(b), it can be seen that the surface defect inspection method disclosed in Non Patent Literature 1 is not capable of detecting the thin linear surface defect that is long in the length direction of the steel strip.

The present invention is made in consideration of above, and an object of the present invention is to provide a surface defect inspection method and a surface defect inspection apparatus capable of improving the sensitivity for a thin and long linear surface defect, and of detecting a thin and long linear surface, defect and a small and short surface defect even when these surface defects are both present.

To solve the problem and achieve the object, a surface defect inspection method according to an embodiment of the present invention includes: an image input step of acquiring an original image by capturing an image of a subject of an inspection; a texture feature image generating step of generating texture feature images by applying a filtering process using spatial filters to the original image; a texture feature extracting step of generating a feature vector at each position of the original image, by extracting a value at a corresponding position from each of the texture feature images, for each of the positions of the original image; an abnormality level calculating step of generating an abnormality level image representing an abnormality level for each position of the original image, by calculating, for each of the feature vectors, an abnormality level in a multi-dimensional distribution formed by the feature vectors; and a detecting step of detecting a part having the abnormality level that is higher than a predetermined level in the abnormality level image as a defect portion or a defect candidate portion.

Moreover, in the surface defect inspection method according to an embodiment of the present invention, the texture feature image generating step includes a process of generating another texture feature image by applying the filtering process using the spatial filters to an image that is a reduction of the original image or to an image that is a reduction of the texture feature image.

Moreover, in the surface defect inspection method according to an embodiment of the present invention, a direction for reducing the original image or for reducing the texture feature image includes a direction in parallel with a linear defect that is to be detected.

Moreover, in the surface defect inspection method according to an embodiment of the present invention, the spatial filters are achieved by wavelet conversion.

Moreover, in the surface defect inspection method according to an embodiment of the present invention, the spatial filters includes a Gabor filter.

Moreover, in the surface defect inspection method according to an embodiment of the present invention, Mahalanobis distance is used as an abnormality level in the multi-dimensional distribution formed by the feature vectors.

Moreover, a surface defect inspection apparatus according to an embodiment of the present invention includes: an image capturing unit configured to capture a subject of an inspection; an image input unit configured to acquire an original image of the subject of the inspection, the original image being captured by the image capturing unit; a texture feature image generating unit configured to generate texture feature images by applying a filtering process using spatial filters to the original image; a texture feature extracting unit configured to generate a feature vector at each position of the original image by extracting a value at a corresponding position from each of the feature images, for each of the positions of the original image; an abnormality level calculating unit configured to generate an abnormality level image representing an abnormality level for each position of the original image, by calculating, for each of the feature vectors, an abnormality level in a multi-dimensional distribution formed by the feature vectors; and a detecting unit configured to detect a part having the abnormality level that is higher than a predetermined level in the abnormality level image as a defect portion or a defect candidate portion.

With the surface defect inspection method and the surface defect inspection apparatus according to the present invention, it is possible to improve the sensitivity for a thin and long linear surface defect, and to detect a thin and long linear surface defect and a small and short surface defect even when these types of surface defects are both present.

BRIEF DESCRIPTION OF DRAWINGS

FIG. 2 is a flowchart illustrating the sequence of a surface defect inspecting process according to one embodiment of the present invention.

FIG. 3 is a flowchart illustrating the sequence of a pre-process applied to an input image.

FIG. 4 is a flowchart illustrating the sequence of a defect detecting process applied to a corrected image.

FIG. 5 is a schematic illustrating one example of a Gabor function plotted to a three-dimensional space.

FIG. 8 is a schematic illustrating one example of a two-dimensional principal component analysis.

FIG. 12 is a schematic illustrating an example of an image of a linear surface defect on a steel strip, a result of detecting the surface defect using the surface defect inspection method disclosed in Non Patent Literature 1, and a result of detecting the surface defect using the defect detecting process according to the present invention.

DETAILED DESCRIPTION OF EMBODIMENTS OF THE INVENTION

A configuration of a surface defect inspection apparatus according to one embodiment of the present invention, and a surface defect inspection method using the surface defect inspection apparatus will now be explained with reference to some drawings.

[Configuration]

Figure 1:
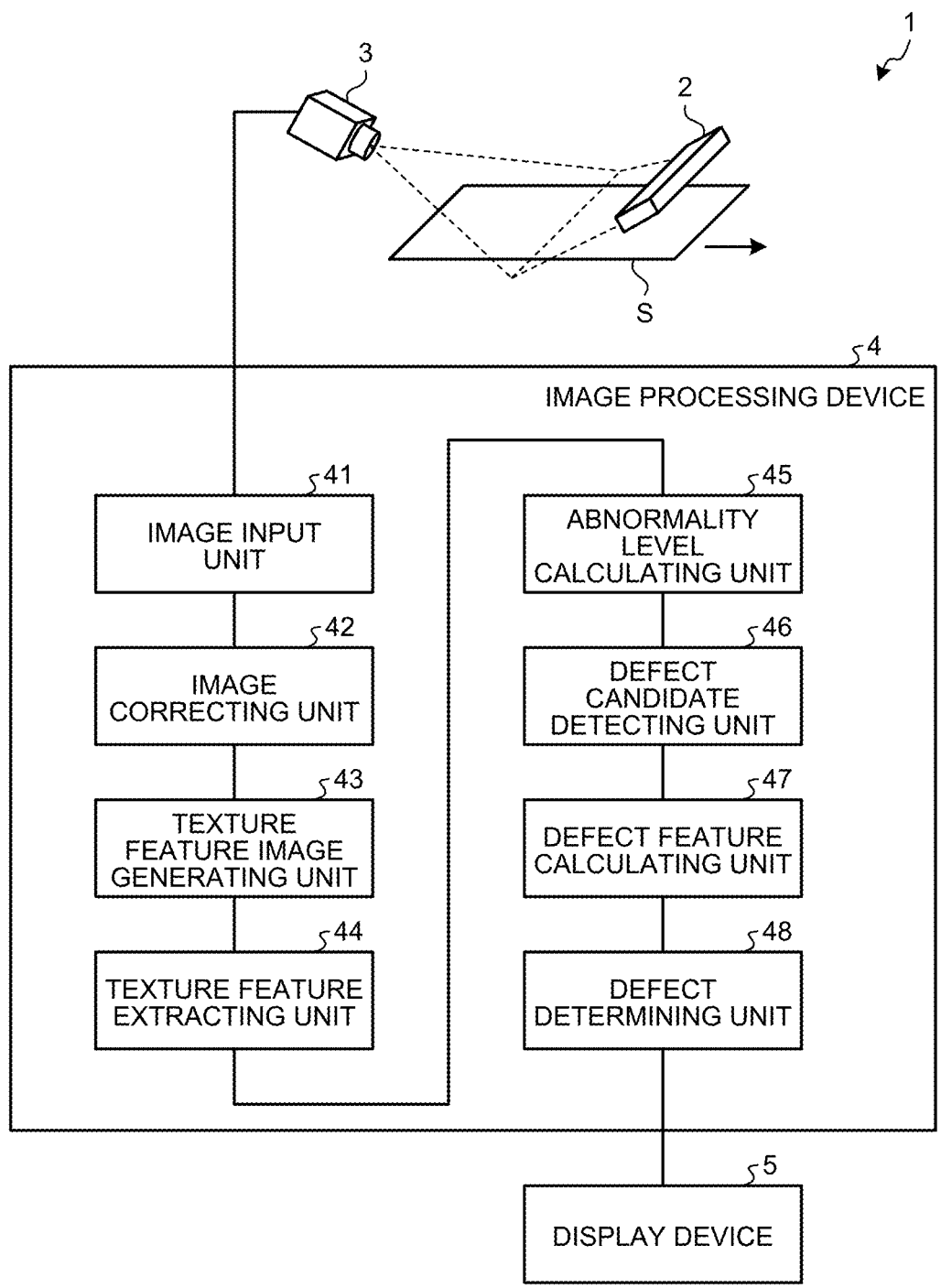
FIG. 1 is a schematic diagram illustrating a configuration of a surface defect inspection apparatus according to one embodiment of the present invention.

FIG. 1 is a schematic diagram illustrating a configuration of a surface defect inspection apparatus according to one embodiment of the present invention. As illustrated in FIG. 1, this surface defect inspection apparatus 1 according to one embodiment of the present invention includes an illumination device 2, an image capturing device 3, an image processing device 4, and a display device 5.

The illumination device 2 illuminates a surface of a steel strip S that is the subject of an inspection performed by the surface defect inspection apparatus 1.

The image capturing device 3 captures an image of a part of the surface of the steel strip S being illuminated by the illumination device 2, and transmits data of the acquired image of the surface of the steel strip S (original image) to the image processing device 4. The image capturing device 3 may be what is called a line sensor camera having a one-dimensional imaging device, or what is called an area camera having a two-dimensional imaging device, but, in either case, the image capturing device 3 captures the image synchronously with the conveyance of the steel strip S. When the image capturing device 3 is a line sensor camera, a continuous illumination device is used as the illumination device 2. When the image capturing device 3 is an area camera, a flash illumination device that emits flash light every time the steel strip S is carried by a certain distance is used as the illumination device 2.

The image processing device 4 analyzes the image data of the surface of the steel strip S received from the image capturing device 3, detects a surface defect, if any, on the surface of the steel strip S, determines the type and the adversity level of the surface defect, and outputs the information to the display device 5.

The image processing device 4 includes an image input unit 41, an image correcting unit 42, a texture feature image generating unit 43, a texture feature extracting unit 44, an abnormality level calculating unit 45, and a defect candidate detecting unit 46, all of which are provided internally. The image processing device 4 also includes a defect feature calculating unit 47 and a defect determining unit 48, as required, that are provided internally.

The image input unit 41 includes an internal temporary storage area, and buffers pieces of surface image data of the steel strip S received from the image capturing device 3, sequentially in the temporary storage area.

The image correcting unit 42 generates a corrected image by sequentially reading the pieces of image data stored in the temporary storage area included in the image input unit 41, and applying a correction process to the read image data. In the correction process, to begin with, if one or both of the edges of the steel strip S are included in the image, the image correcting unit 42 detects the position of the edge, sets the image area corresponding to the outside of the edge of the steel strip S as an area to be excluded from the inspection, and fills the area to be excluded from the inspection with a mirror image of the inner area of the steel sheet S, being inner with respect to a border at the edge position, for example. The image correcting unit 42 then corrects (applies a shading correction of) the luminance non-uniformity resultant of illuminance non-uniformity attributable to the illumination device 2, in the image of the steel strip S, so that the entire image comes to have a uniform brightness.

The texture feature image generating unit 43 applies a plurality of spatial filters to the corrected image, and generates a plurality of feature images (hereinafter, sometimes particularly referred to as texture feature images) corresponding to the respective spatial filters, and representing the features (local frequency features) of a local pattern (texture) at each position of the image. The spatial filter herein is a process for generating an output image using a corresponding pixel of the input image, and the pixel values surrounding that pixel. Particularly, it is preferable to use a plurality of spatial filters allowing different wavelength ranges to be passed, or allowing signals in different waveform directions to be passed.

The texture feature extracting unit 44 extracts a value from each of the texture feature images generated by the texture feature image generating unit 43, at a position corresponding to each position of the input image or the corrected image, and extracts a texture feature vector at the position of the image. The number of the texture feature vectors corresponds to the number of the pixels of the entire image, and the dimension of the texture feature vector is matched with the number of the texture feature images.

The abnormality level calculating unit 45 analyzes a distribution in the multi-dimensional space formed by the texture feature vectors extracted by the texture feature extracting unit 44, and calculates an abnormality level for each of the texture feature vectors. The abnormality level calculating unit 45 then generates an abnormality level image by mapping the calculated abnormality level of each of the texture feature vectors, to the corresponding position of the image.

The defect candidate detecting unit 46 binarizes the abnormality image generated by the abnormality level calculating unit 45 using a predetermined abnormality level as a threshold, and detects (labels) an image area in which pixels having an abnormality level equal to or higher than the predetermined threshold are connected continuously as a defect portion or a defect candidate. The defect candidate detecting unit 46 may also perform a process for excluding a defect candidate that can be considered as not being an adverse defect, e.g., a defect the area of which is too small, from the detected defect candidates, or a process of connecting a plurality of defect candidates detected at nearby position as one defect candidate.

The defect feature calculating unit 47 calculates a defect feature quantity for each of the defect candidates detected by the defect candidate detecting unit 46. The defect feature quantity is calculated using a defect portion gray-scale image that is a cutout of a region corresponding to the defect candidate from the corrected image, and a defect portion abnormality level image that is also a cutout of a region of the defect candidate from the abnormality level image.

The defect determining unit 48 determines the defect type and the adversity level of each of the defect candidates based on the defect feature quantity calculated by the defect feature calculating unit 47.

The display device 5 displays information related to the surface defects detected by the image processing device 4, such as detection information (the images and the positions of the surface defects), determination information (the types, the adversity levels), and statistical information (e.g., the total number and the frequency at which surface defects of each type and each adversity level appear in the entire steel strip S).

[Surface Defect Inspecting Process]

A surface defect inspecting process according to one embodiment of the present invention will be explained in detail with reference to FIGS. 2 to 6.

FIG. 2 is a flowchart illustrating the sequence of the surface defect inspecting process according to one embodiment of the present invention. When the surface defect inspection apparatus 1 receives a command for starting a surface defect inspection, the image capturing device 3 is caused to capture images of the surface of the steel strip S. The data of the captured images (hereinafter, referred to input images) is sequentially buffered in the temporary storage area in the image input unit 41, which is included in the image processing device 4.

As illustrated in FIG. 2, after the surface defect inspection is started, the image processing device 4 determines whether there is any unprocessed input image data in the temporary storage area in the image input unit 41 (Step S1). When the image capturing device 3 is a line sensor camera, the image processing device 4 keeps determining that there is no unprocessed input image data until the image data corresponding a predetermined number of lines are buffered. As a result of the determination, if there is no unprocessed input image data (No at Step S1), the image processing device 4 waits until a new piece of image data is received. If there is some unprocessed input image data (Yes at Step S1), the image processing device 4 executes a pre-process (Step S2), a defect detecting process (Step S3), and a defect determining process (Step S4) sequentially. The image processing device 4 then determines whether an instruction for ending the surface defect inspection has been issued (Step S5). As a result of the determination, if an instruction for ending the surface defect inspection has been issued (Yes at Step S5), the image processing device 4 ends the surface defect inspection. If the instruction for ending the surface defect inspection has not been issued yet (No at Step S5), the image processing device 4 shifts the process to Step S1, and continues the surface defect inspecting process.

[Pre-Process]

The pre-process (Step S2) will now be explained with reference to FIG. 3.

FIG. 3 is a flowchart illustrating the sequence of the pre-process applied to the input image. As illustrated in FIG. 3, the pre-process includes an edge detecting step S21, an outside-of-edge correcting step S22, and a shading correcting step S23. These processes are executed by the image correcting unit 42.

At the edge detecting step S21, the image correcting unit 42 detects the position of an edge of the steel strip S from an input image I(x, y). Where x is the coordinate of a pixel corresponding to the width direction of the steel strip S, and y is the coordinate of the pixel corresponding to the length direction of the steel strip S, and x=0, 1, . . . , $n_x$–1, and y=0, 1, . . . , $n_y$–1. $n_x$ represents the size of the image in the x direction, and $n_y$ represents the size in the y direction.

At the outside-of-edge correcting step S22, the image correcting unit 42 designates the area outside of the edge of the steel strip S as an area to be excluded from the inspecting process, and generates an outside-of-edge corrected image $I_E(x, y)$ that is no longer adverse, by filling the area to be excluded from the inspecting process with values in the area on the inner side of the edge, as a mirror image, for example, so that no edge portion is detected therefrom.

At the shading correcting step S23, the image correcting unit 42 computes a corrected image $I_C(x, y)$ in which the brightness of the entire image is uniformized, by correcting the luminance non-uniformity of (applying a shading correction to) the outside-of-edge corrected image $I_E(x, y)$. In the shading correction process, for example, the brightness may be standardized by subtracting a moving average of the one-dimensional luminance from the luminance in the original image, and dividing the result with the moving average, or by performing the same process using a moving average of two-dimensional luminance in both directions of the x and the y directions. Furthermore, it is also possible to use a low-pass filter instead of the moving average of the luminance. Still furthermore, as a simple method, a luminance difference or a high-pass filter that is equivalent thereto may also be used.

In the series of pre-processes described above, it is possible to perform any of the edge detecting step S21, the outside-of-edge correcting step S22, and the shading correcting step S23 in a selective manner, as appropriate, depending on the conditions of the input image I(x, y). If none of these steps are to be performed, for example, the corrected image $I_C(x, y)$=the input image I(x, y).

[Defect Detecting Process]

The defect detecting process (Step S3) will now be explained with reference to FIGS. 4 to 6.

FIG. 4 is a flowchart illustrating the sequence of the defect detecting process applied to the corrected image. As illustrated in FIG. 4, the defect detecting process includes a texture feature image generating step S31, a texture feature extracting step S32, an abnormality level calculating step S33, and a defect candidate detecting step S34.

At the texture feature image generating step S31, the texture feature image generating unit 43 generates a texture feature image $F_j(x, y)$ (j=0, 1, 2, . . . , $N_T$–1) by applying a plurality of filtering processes to the corrected image $I_C(x, y)$. Where $N_T$ is the number of spatial filters. In this embodiment, Gabor filters are used as the spatial filters. A Gabor filter is a linear filter that uses a Gabor function expressed as Equation (1) below.

$$\text{Gabor}(x, y; a, b, \lambda, \theta) = \exp\left[-\frac{\pi}{2}a^2(x^2 + b^2 y^2)\right] \exp\left[2\pi i \frac{(x\cos\theta + y\sin\theta)}{\lambda}\right] \quad (1)$$

Equation (1) is a general expression of a Gabor filter, and has a format of a multiplication of a Gaussian attenuation function with a sine wave. In Equation (1), λ represents the wavelength of the sine wave, and θ represents the direction of the stripe pattern of the Gabor function. "a" represents the spread of the wavelength (the bandwidth of the Gaussian function). "b" represents the space aspect ratio, and represents the ellipticity of the support of the Gabor function. "i" is an imaginary unit. FIGS. 5(a) and (b) are plots of a Gabor function Gabor(x, y:a, b, λ, θ), with λ=8, θ=120 degrees, a=0.125, b=1.5 set to Equation (1), in a three-dimensional space. As illustrated in FIGS. 5(a) and (b), the Gabor function Gabor(x, y:a, b, λ, θ) has a shape of an infinite sine wave that is cut off using a Gaussian function as a window function. By changing a, b, and θ, it is possible to change the orientation of the Gabor function, the direction of the wave, and the attenuation ratio.

In image analyses, the Gabor function indicated as Equation (1) is used as a spatial filter, but sometimes a Gabor function indicated as Equation (2) below, particularly b=1, a=1/λ, is used. The following explanations will be made using Equation (2).

$$\text{Gabor}(x, y; \lambda, \theta) = \exp\left[-\frac{\pi}{2}\frac{(x^2 + y^2)}{\lambda^2}\right] \exp\left[2\pi i \frac{(x\cos\theta + y\sin\theta)}{\lambda}\right] \quad (2)$$

By performing a convolution operation of the Gabor filter on the image, the local frequency component of the wavelength λ (pixel) and the orientation θ of the wave can be extracted. Furthermore, by changing the parameters λ and θ variously, and also changing the scales in the x and y directions variously (e.g., the spread in the x direction can be increased four times by replacing x with x/4), local frequency components of the image corresponding thereto can be extracted. In the practical computation, however, if the spread of the Gabor filter is increased, the computational time required in the convolution operation will be also increased. Therefore, it is better to use a technique for reducing the image size by down-sampling, instead of increasing the spread of the Gabor filter, as will be explained later. It is, however, preferable to apply a low-pass filter to the image to which the filtering is to be applied, in advance, to avoid aliasing.

Figure 6:
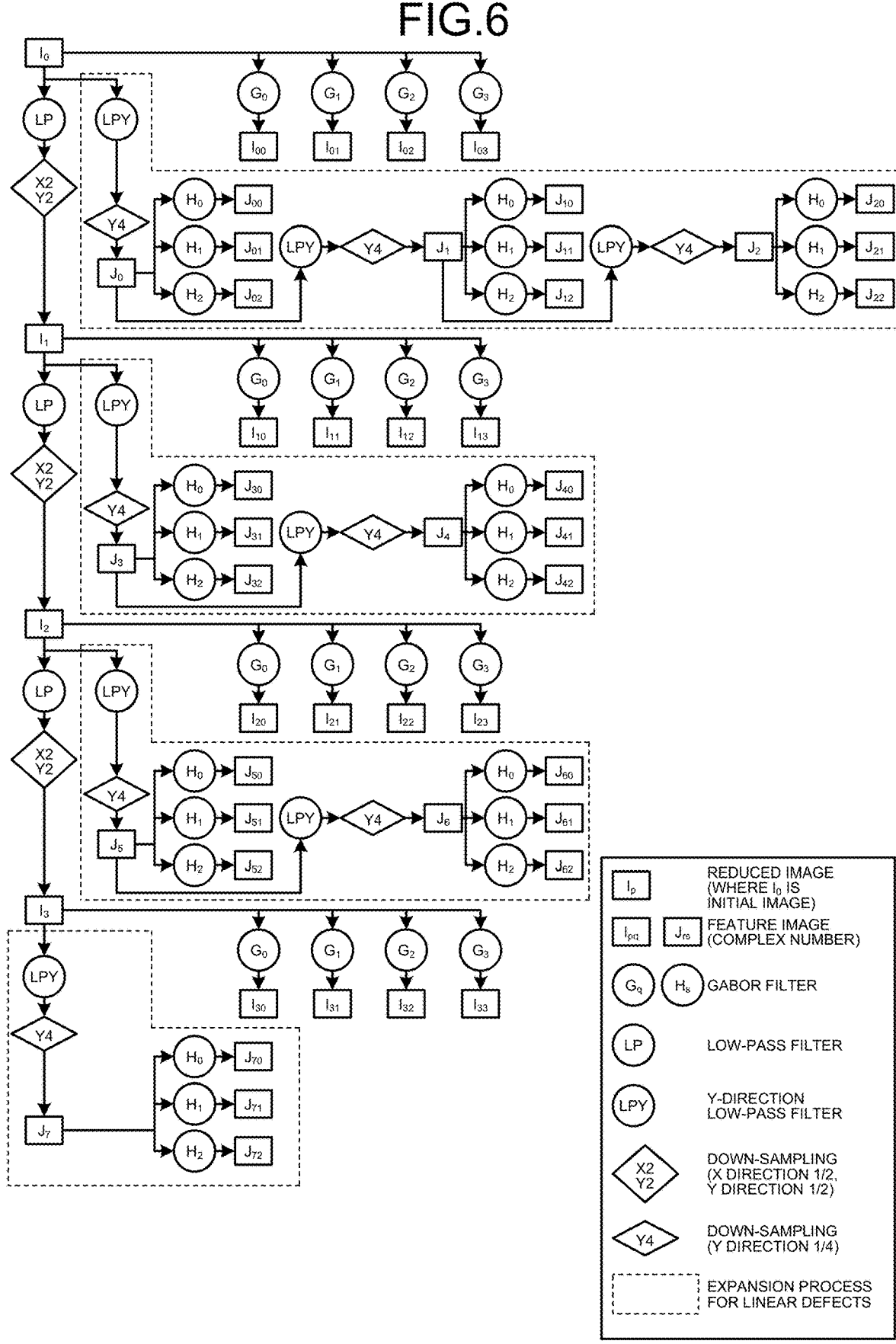
FIG. 6 is a block diagram illustrating a Gabor filtering process in the embodiment of the present invention.
Figure 7:
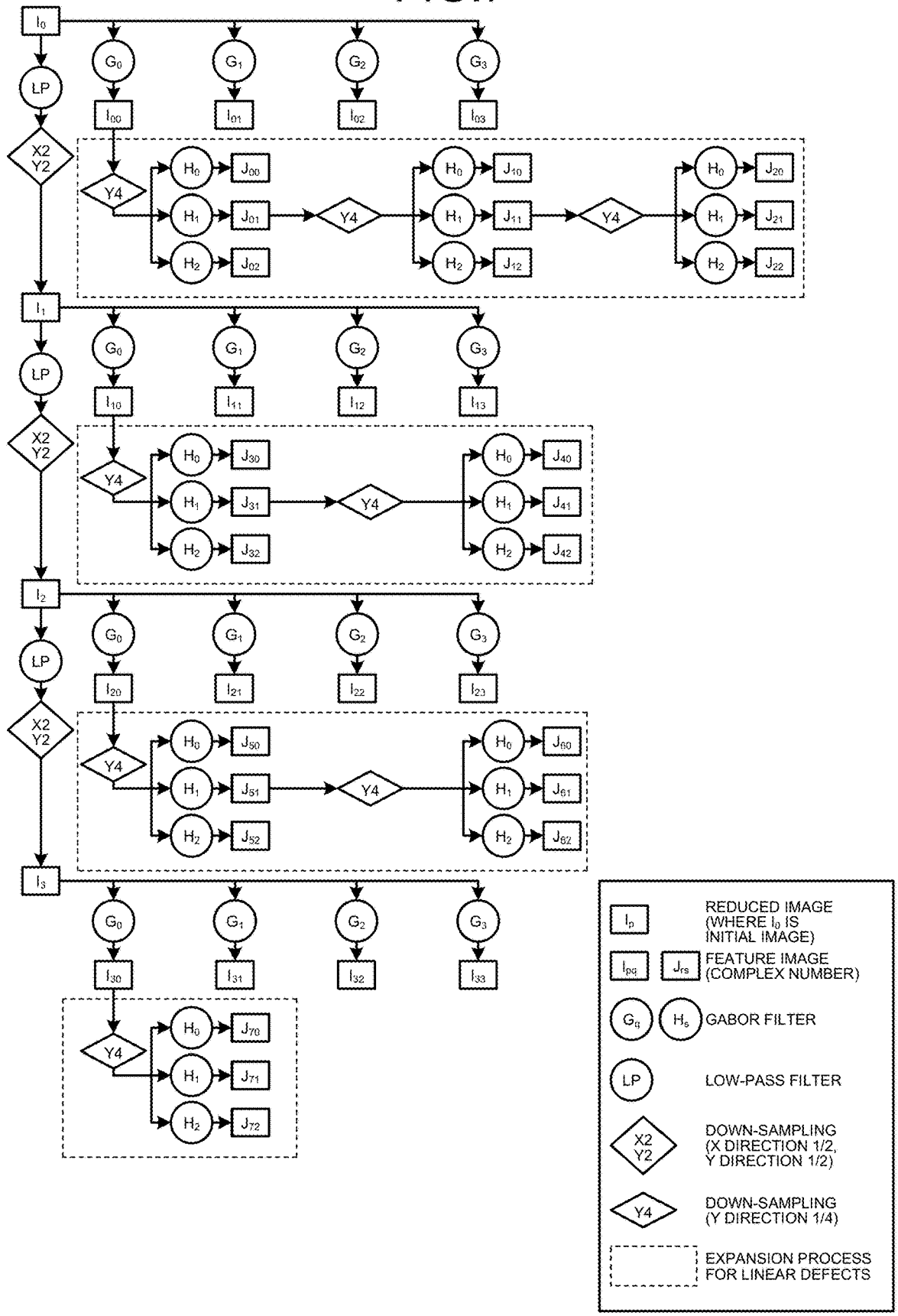
FIG. 7 is a block diagram illustrating a modification of the Gabor filtering process in the embodiment of the present invention.

FIG. 6 is a block diagram illustrating the Gabor filtering process in the embodiment of the present invention. In FIG. 6, $G_q(x, y)$ (q=0, 1, 2, 3) and $H_s(x, y)$ (s=0, 1, 2) are filter coefficient matrices of $k_x \times k_y$ pixels, following the definitions indicated in Equations (3) to (6) below, and mean that a convolution operation of the Gabor filter on the image is to be performed. It is herein assumed that the coordinate (x, y) at the center of the filter coefficient matrix is (0, 0). In Equations (3), (5) indicated below, λ=4, and in Equations (4), (6), λ=4/√2, but λ is determined based on the sampling theorem (λ≥2) and the space frequency in a corresponding direction of the signals to be detected.

$$G_q(x, y) = \text{Gabor}\left(x, y; 4, \frac{\pi}{4}q\right), q = 0, 1, 2, 3, \quad (3)$$

$$H_0(x, y) = \text{Gabor}\left(x, y; \frac{4}{\sqrt{2}}, \frac{\pi}{4}\right), \quad (4)$$

$$H_1(x, y) = \text{Gabor}(x, y; 4, 0), \quad (5)$$

$$H_2(x, y) = \text{Gabor}\left(x, y; \frac{4}{\sqrt{2}}, -\frac{\pi}{4}\right) \quad (6)$$

In the definitions indicated in Equations (3) to (6), $k_x=k_y=11$ is suitable. The number of waves in the direction in which the wave travels in the Gabor function illustrated in FIG. 5(a) (the direction of θ (=120 degrees)) is 2.5 cycles or more. In order to satisfy this condition, more precisely, conditions $k_x/(\lambda \cos\theta) > 2.5$, and $k_y/(\lambda \sin\theta) > 2.5$ need to be met. At this time, the attenuation in the first term of Equation (2) is equal to or less than 10 percent of the median, so that the Gabor filter enables extractions of spatially localized signals.

In FIG. 6, LP is a low-pass filter in two-dimensional directions of xy, and LPY is a low-pass filter in the y direction. LP and LPY mean that filter matrixes according to the definitions indicated in Equations (7) and (8) below are applied to the image, for example. A convolution operation of the low-pass filter LPY is performed in the orientation that is the moving average of four points in the y direction. The low-pass filters LP and LPY are designed as filters for preventing aliasing during the down-sampling, which will be described later. The low-pass filters do not need to be those indicated in Equations (7) and (8) below, as long as such low-pass filters can prevent aliasing.

$$LP = hh^T, h = \frac{1}{16}[1\ 4\ 6\ 4\ 1] \quad (7)$$

$$LPY = \frac{1}{4}[1\ 1\ 1\ 1]^T \quad (7)$$

In the convolution operation of these two low-pass filters LP and LPY described above on the image, the computations are carried out assuming that the outside of the image border is a mirror image. Furthermore, the block denoted as "X2, Y2" in FIG. 6 indicates down-sampling in which a pixel is extracted out of every two pixels in the X direction and the Y direction of the image, and reducing the image size to a half in the X direction and the Y direction. The block denoted as "Y4" indicates down-sampling in which one pixel is extracted out of every four pixels only in Y direction, and reducing the image size to a quarter in the Y direction. A series of Gabor filtering processes according to the block diagram illustrated in FIG. 6 will now be explained.

To begin with, the texture feature image generating unit 43 sets the initial image as $I_0(x, y) = I_C(x, y)$. The texture feature image generating unit 43 then computes reduced images $I_p$(p=1, 2, 3)(x, y) by sequentially applying the low-pass filter LP and the "X2, Y2" down-sampling to the initial image $I_0(x, y)$. $I_p(x, y)$ are reduced images resultant of applying the low-pass filter LP and the "X2, Y2" down-sampling p times. The texture feature image generating unit 43 also computes feature images $I_{pq}(x, y)$ (p=0, 1, 2, 3, q=0, 1, 2, 3) by performing a convolution operation of each of four Gabor filters $G_q(x, y)$ (q=0, 1, 2, 3) on each of the reduced images $I_p(x, y)$ (p=0, 1, 2, 3) including the initial image.

At this stage, 16 feature images $I_{pq}(x, y)$ in total are acquired, but, because the feature images $I_{pq}(x, y)$ are complex numbers according to the equation defining the Gabor filter (Equation (1)), by decomposing each of the feature images into a real part image and an imaginary part image, 32 feature images in total are acquired. Therefore, these are established as a texture feature images $F_j(x, y)$ (j=0, 1, 2, ..., 31, that is, $N_T=32$). However, because the feature images $I_{pq}(x, y)$ satisfying p≥1 have been reduced in size by the down-sampling, such feature images are enlarged to the size of the initial image $I_0(x, y)$, and used as the texture feature images. As a method for enlarging the size, it is possible to use a linear interpolation, an approach for setting the same value as the nearest pixel, or an approach for copying and filling with the same value as that in each pixel of the feature image $I_{pq}(x, y)$ in the number down-sampled, in the down-sampled direction.

With this operation, spatial filters having different space frequencies and having different waveform directions of the spatial filters can be combined and applied to the original image. Particularly, by performing a convolution operation of the original spatial filter on the down-sampled image, the same effect as that achieved by applying a spatial filter having a higher spatial frequency on the original image can be achieved with a smaller amount of computation. While it is possible to use the 32 texture feature images $F_j(x, y)(j=0, 2, \ldots, 31)$ acquired by the process described above, by performing an "expansion process for linear defects" surrounded by dotted lines in FIG. 6, the detection sensitivity can be improved for the defects that are thin and long in the direction in which the steel strip S flows. The "expansion process for linear defects" is performed in the manner described below, after the computations of the reduced images $I_p(x, y)(p=0, 1, 2, 3)$ have been completed.

To begin with, the texture feature image generating unit 43 computes feature images $J_{0s}(x, y)$ (s=0, 1, 2) by performing convolution operations of three Gabor filters $H_s(x, y)$ (s=0, 1, 2) on an image $J_0(x, y)$ generated by performing the "Y4" down-sampling of the image $I_0(x, y)$. The texture feature image generating unit 43 also computes feature images $J_{1s}(x, y)$ (s=0, 1, 2) by performing convolution operations of the three Gabor filters $H_s(x, y)$(s=0, 1, 2) on an image $J_1(x, y)$ generated by performing the "Y4" down-sampling to the image $J_0(x, y)$. The texture feature image generating unit 43 also computes feature images $J_{2s}(x, y)$(s=0, 1, 2) by performing convolution operations of the three Gabor filters $H_s(x, y)$ (s=0, 1, 2) on an image $J_2(x, y)$ generated by performing the "Y4" down-sampling to the image $J_1(x, y)$.

The texture feature image generating unit 43 then computes feature images $J_{3s}(x, y)$ (s=0, 1, 2) by performing convolution operations of the three Gabor filters $H_s(x, y)$(s=0, 1, 2) on an image $J_3(x, y)$ generated by performing the "Y4" down-sampling to the image $I_1(x, y)$. The texture feature image generating unit 43 then computes feature images $J_{4s}(x, y)$(s=0, 1, 2) by performing convolution operations of the three Gabor filters $H_s(x, y)$ (s=0, 1, 2) on an image $J_4(x, y)$ generated by performing the "Y4" down-sampling to the image $J_3(x, y)$. The texture feature image generating unit 43 then computes feature images $J_{5s}(x, y)$(s=0, 1, 2) by performing convolution operations of the three Gabor filters $H_s(x, y)$ (s=0, 1, 2) on an image $J_5(x, y)$ generated by performing the "Y4" down-sampling to the image $I_2(x, y)$. The texture feature image generating unit 43 also computes feature images $J_{6s}(x, y)$(s=0, 1, 2) by performing convolution operations of the three Gabor filters $H_s(x, y)$(s=0, 1, 2) on an image $J_6(x, y)$ generated by performing the "Y4" down-sampling to the image $J_5(x, y)$.

The texture feature image generating unit 43 then computes feature images $J_{7s}(x, y)$ (s=0, 1, 2) by performing convolution operations of the three Gabor filters $H_s(x, y)$(s=0, 1, 2) on an image $J_7(x, y)$ generated by performing the "Y4" down-sampling to the image $I_3(x, y)$. Through the operations described above, it is possible to apply spatial filters having a spatial frequency longer in the Y direction, so that the S/N ratio for the surface defects that are long in the Y direction can be improved. By setting the direction for which the S/N ratio is improved to the direction in which the surface defects that are long in the Y direction appear, that is, the longitudinal direction of the steel strip S in the manufacturing process of the steel strip S, long surface defects can be detected more easily, advantageously.

Through the process described above, additional 32 feature images $J_{rs}(x, y)$ (r=0, 1, . . . , 7, s=0, 1, 2) are acquired. Among all of these feature images including the 16 feature images $I_{pq}$ having been acquired previously, and the additional 32 feature images $J_{rs}$, each of the following 32 feature images in total, including the feature images $I_{pq}(x, y)$ (p=0, 1, 2, 3, q=1, 2, 3), $J_{00}(x, y)$, $J_{02}(x, y)$, $J_{10}(x, y)$, $J_{12}(x, y)$, $J_{20}(x, y)$, $J_{21}(x, y)$, $J_{22}(x, y)$, $J_{30}(x, y)$, $J_{32}(x, y)$ $J_{40}(x, y)$, $J_{41}(x, y)$, $J_{42}(x, y)$, $J_{50}(x, y)$, $J_{52}(x, y)$, $J_{60}(x, y)$, $J_{61}(x, y)$, $J_{62}(x, y)$, $J_{70}(x, y)$, $J_{71}(x, y)$, $J_{72}(x, y)$ that are at the terminals in FIG. 6 is decomposed into a real part image and an imaginary part image, to acquire 64 texture feature image $F_j(x, y)$ (j=0, 1, 2, . . . , 64, that is, $N_T$=64).

Because the feature images $J_{rs}(x, y)$ have been reduced by down-sampling, in the same manner as those without the "expansion process for linear defects" being performed, these feature images are enlarged to the size of the initial image $I_0(x, y)$, and used as the texture feature images. The correspondence between the value j and each of the feature images may be determined in any way, but in the explanation herein, the feature images described above are indicated as follows, for the convenience of explanation, from those with smaller suffixes assigned to I and J, in the order of the real part and the imaginary part: The real part of $I_{00}(x, y)$=0; the imaginary part of $I_{00}(x, y)$=1; the real part of $I_{01}(x, y)$=2, . . . , the real part of $J_{00}(x, y)$=25, . . . , the imaginary part of $J_{72}(x, y)$=64.

Used in the algorithm herein are 64 texture feature images $F_j(x, y)$ (j=0, 1, 2, . . . , 63) acquired by decomposing each of the 12 texture feature images $I_{01}(x, y)$, $I_{02}(x, y)$, $I_{03}(x, y)$, $I_{11}(x, y)$, $I_{12}(x, y)$, $I_{13}(x, y)$, $I_{21}(x, y)$, $I_{22}(x, y)$, $I_{23}(x, y)$, $I_{31}(x, y)$ $I_{32}(x, y)$, $I_{33}(x, y)$, and additional 20 texture feature images $J_{00}(x, y)$, $J_{02}(x, y)$, $J_{10}(x, y)$, $J_{12}(x, y)$, $J_{20}(x, y)$, $J_{21}(x, y)$, $J_{22}(x, y)$, $J_{30}(x, y)$, $J_{32}(x, y)$, $J_{40}$ (x, y), $J_{41}(x, y)$, $J_{42}(x, y)$, $J_{50}(x, y)$, $J_{52}(x, y)$, $J_{60}(x, y)$, $J_{61}$ (x, y), $J_{62}(x, y)$, $J_{70}(x, y)$, $J_{71}(x, y)$, $J_{72}(x, y)$, that is, 32 texture feature images in total, into an image corresponding to the real part and an image corresponding to the imaginary part. It is also possible to use sixty-eight texture feature images, with additions of $I_{00}(x, y)$, $I_{10}(x, y)$, $I_{20}(x, y)$, $I_{30}(x, y)$, but these can be omitted because the filters $J_{xx}(x, y)$ cover the range passed by the frequency range resultant of applying a fast Fourier transform (FFT) to the filters $I_{00}(x, y)$, $I_{10}(x, y)$, $I_{20}(x, y)$, $I_{30}(x, y)$. By limiting the number to 64, not only the amount of computations can be reduced, but also numbers can be handled more easily in the subsequent computations, advantageously, because the images corresponding to 2 raised to the power of 6 are used.

The embodiment at the texture feature image generating step S4 is not limited to that described above, and it is also possible to use another set of spatial filters. For example, two-dimensional wavelet conversion or wavelet packet conversion are applicable, and the simplest one is the Haar wavelet. Alternatively, differential filters, edge extraction filters, Difference-of-Gaussian (DoG) filters, Laplacian-of-Gaussian (LoG) filters, or the like may be used, or these filters may be used in combination.

Furthermore, as mentioned earlier, the anti-aliasing filter applied prior to the down-sampling described above does not need to be the spatial filter described above. Use of the Gabor filters in acquiring the texture feature images has an advantage that the amount of computations is reduced. FIG.

7 illustrates such a sequence, and the spatial filter $G_0$ is used in replacement of the low-pass filter LPY.

At the texture feature extracting step S32, the texture feature extracting unit 44 extracts a texture feature vector at each pixel. For the feature images $F_j(x, y)=\{f_j(x, y)\}$ (where $f_j(x, y)$ represents the value at the coordinate x, y in the feature image $F_j(x, y)$), by replacing the x, y pair with another index i, as indicated in Equation (9) below, the feature vector can be defined as $F_j'=\{f_{i,j}\}; j=0, 2, \ldots, N_T-1$, as indicated in Equation (10) below. Where i is an index uniquely assigned to a pixel (x, y) of the input image (corrected image), and is defined as $i=n_x \times y+x$, for example, and $i=0, 1, 2, \ldots, n_x \times n_y-1$. Furthermore, $f_{i,j}=f_j(x, y)$ is established.

$$F_j(x, y) = \begin{pmatrix} f_j(1,1) & f_j(2,1) & \ldots & f_j(n_x,1) \\ f_j(1,2) & \ddots & & \vdots \\ \vdots & & f_1(x,y) & \vdots \\ & & & \ddots \\ f_j(1,n_y) & & \ldots & f_j(n_x,n_y) \end{pmatrix} = \begin{pmatrix} f_{0,j} & f_{1,j} & \ldots & f_{n_x-1,j} \\ f_{n_x,j} & \ddots & & \\ \vdots & & f_{n_x \times y+x,j} & \vdots \\ & & & \ddots \\ f_{n_x \times (n_y-1),j} & & \ldots & f_{n_x \times n_y-1,j} \end{pmatrix} \quad (9)$$

$$F_j' = (f_{0,j} \; f_{1,j} \; \ldots \; f_{n_x-1,j} \; f_{n_x,j} \; \ldots \; f_{n_x \times y+x,j} \; \ldots \; f_{n_x \times n_y-1,j}) \quad (10)$$

At the abnormality level calculating step S33, the abnormality level calculating unit 45 generates an abnormality level image by statistically analyzing the distribution of the texture feature vectors extracted at the texture feature extracting step S32, in the $N_T$-dimensional space, and by calculating the abnormality level at each pixel of the input image (corrected image). As the abnormality level, Mahalanobis distance is used, for example. Specifically, to begin with, the abnormality level calculating unit 45 prepares a matrix F in which the feature vectors $F_j$ are arranged as row vectors, and such row vectors are arranged in the column direction, as indicated in Equation (11) below.

$$F = \begin{pmatrix} F_1' \\ F_2' \\ \vdots \\ F_{N_T-1}' \end{pmatrix} = \begin{pmatrix} f_{1,0} & f_{1,1} & \ldots & f_{1,n_y n_x-1} \\ f_{2,0} & \ddots & & \vdots \\ \vdots & & f_{i,y \times n_x+x} & \vdots \\ & & & \ddots \\ f_{N_T-1,0} & & & f_{N_T-1,n_y n_x-1} \end{pmatrix} \quad (11)$$

The abnormality level calculating unit 45 then calculates $m_j$ indicated in Equation (12) below. $\Sigma$ in Equation (12) represents the sum across the entire pixels, and $m_j$ is the average across the entire pixels of the matrix F.

$$m_j = \frac{1}{n_x n_y} \sum_i f_{i,j} \quad (12)$$

The abnormality level calculating unit 45 acquires a matrix Z ($=\{z_{i,j}\}$) resultant of subtracting the average $m_j$ from the matrix F, as indicated in Equation (13) below.

$$Z = \{z_{i,j}\}, z_{i,j} = f_{i,j} - m_j \quad (13)$$

At this time, the abnormality level calculating unit 45 calculates variance-covariance matrix $C=\{c_{j1,j2}\}$ (j1, j2=0, 1, 2, ..., $N_T-1$) from $z_{i,j}$, as indicated in Equation (14) below.

$$C = \{c_{j1,j2}\} = \frac{1}{n_x n_y - 1} Z^T Z = \frac{1}{n_x n_y - 1} \sum_{k=0}^{n_x n_y - 1} z_{k,j1} z_{k,j2} \quad (14)$$

The abnormality level calculating unit 45 then calculates Mahalanobis distance $D_i$ (the square of the Mahalanobis distance, to be exact, but it is herein simply referred to as a Mahalanobis distance), as indicated in Equation (15) below.

$$D_i = \sum_j z_{i,j} w_{i,j} \quad (15)$$

Where $W=\{w_{i,j}\}$ is a solution of simultaneous equations WC=Z, that is, $W=ZC^{-1}$. Finally, the abnormality level calculating unit 45 re-maps the Mahalanobis distance $D_i$ to the coordinate (x, y) based on the index i, to acquire an abnormality level image $D(x, y)=D_i$ ($i=x+n_x \times y$).

The calculation for acquiring the Mahalanobis distance is equivalent to the following operation. In other words, it can be understood that, looking at each coordinate of the $N_T$ feature images $F_j(x, y)$, the coordinate has $N_T$-dimensional value of $f_1(x, y), f_2(x, y), \ldots, f_{NT}(x, y)$. This can be represented as a point in the $N_T$-dimensional space, as $p(x, y)=(f_1(x, y), f_2(x, y), \ldots, f_{NT}(x, y))$ In the manner described above, every pixel of the image is plotted to the $N_T$-dimensional space. The plotted set is then standardized for dispersion. The distance from the point of origin in the standardized space represents the Mahalanobis distance.

The standardization for the dispersion is achieved by taking an orthogonal basis from the directions in which the dispersion is the highest, calculating the standard deviation that is the dispersion in each of the basis directions, and dividing each component of the basis direction by the standard deviation. This is the same as what is called a principal component analysis. FIG. 8 illustrates one example of the two-dimensional principal component analysis. In the principal component analysis illustrated in FIG. 8, the standardization for the dispersion is achieved by taking a first principal component and a second principal component that are orthogonal to each other sequentially from the directions in which the dispersion is highest, calculating the dispersion in each of the principal components, and dividing the component in each of the principal component direction by the dispersion. In FIG. 8, O denotes the point of origin, D denotes the Mahalanobis distance, and P denotes the pixel.

At the defect candidate detecting step S34, the defect candidate detecting unit 46 binarizes the abnormality level image D(x, y) using a threshold $D_{thr}$ and detects an area where the pixels satisfying $D(x, y) \geq D_{thr}$ are connected as a defect portion or a defect candidate. Furthermore, at this step, the defect candidate detecting unit 46 may impose a constraint on the areas of the regions to be connected or to the maximum value of the abnormality level within the regions to be connected, and excludes the defect candidate not satisfying the constraint. For example, the defect candidate detecting unit 46 excludes a defect candidate having an area smaller than, and having a highest abnormality level lower than respective minimum value settings. Furthermore, for any two of the defect candidates, if the distance between the regions to be connected satisfies a predetermined condition, the defect candidate detecting unit 46 performs a process of connecting the defect candidates as one and the same defect candidate. For example, assuming that a coordinate in a defect candidate 1 is $(x_1, y_1)$, that a coordinate in a defect candidate 2 is $(x_2, y_2)$, that a distance constraint pertaining to the x coordinate is denoted as $d_x$, that the distance constraint pertaining to the y coordinate is denoted as $d_y$, if there are coordinates $(x_1, y_1)$, $(x_2, y_2)$ that satisfy $|x_1-x_2|<d_x$ and $|y_1-y_2|<d_y$, the defect candidate detecting unit 46 connects the defect candidate 1 and the defect candidate 2. This connection may be performed by repeating image expansions and contractions.

It is favorable to set the threshold $D_{thr}$ as indicated in Equation (16) below, under an assumption that the Mahalanobis distance (the square thereof) follows a Chi-squared distribution. In Equation (16), $p_{thr}$ represents a significance level (probability) for determining that the abnormality level is a defect, and $f\chi_2^{-1}(p, n)$ is an inverse function of a cumulative distribution function in the Chi-squared distribution with a freedom of n. In this manner, the threshold can be established for the abnormality level as a probability.

$$D_{thr}=f_{\chi^2}^{-1}(1-p_{thr},N_T) \qquad (16)$$

[Defect Determining Process]

The defect determining process (Step S4) will now be explained with reference to FIG. 9.

Figure 9:
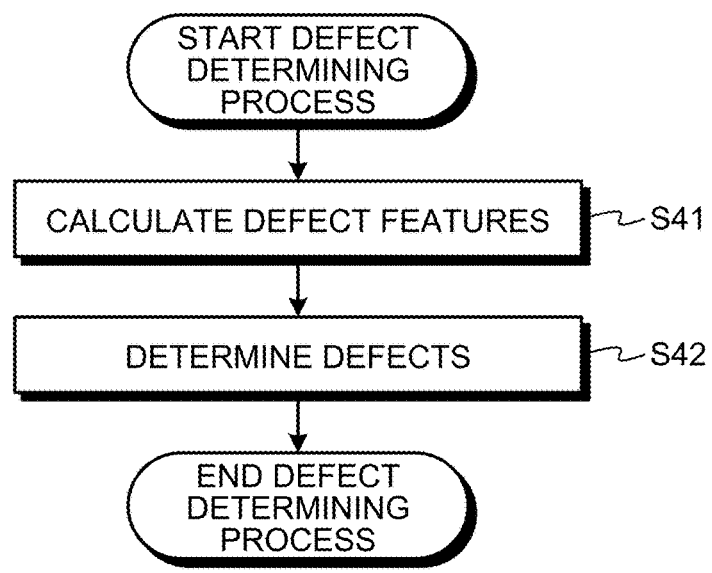
FIG. 9 is a flowchart illustrating the sequence of a defect determining process.

FIG. 9 is a flowchart illustrating the sequence of the defect determining process. As illustrated in FIG. 9, the defect determining process includes a defect feature calculating step S41 and a defect determining step S42.

At the defect feature calculating step S41, the defect feature calculating unit 47 performs various operations to a defect portion gray-scale image that is a cutout of the region of the defect candidate from the corrected image $I_C(x, y)$, and the defect portion abnormality level image that is a cutout of the region of the defect candidate from the abnormality level image $D(x, y)$, to calculate defect feature quantities. Examples of typical defect feature quantities include those pertaining to the size or the shape of the defect, e.g., the width, the length, the area, the aspect ratio, and the perimeter length, for example, and those pertaining to the gray scale, such as the maximum luminance, the minimum luminance, the average luminance, and the histogram frequency related to the luminance within the defect area, and these quantities are acquired from the defect portion gray-scale image. Furthermore, in the embodiment, the feature quantities pertaining to the abnormality level are also acquired from the defect portion abnormality level image, and examples of such feature quantities include the maximum abnormality level, the average abnormality level, and the histogram frequency related to the abnormality level in the defect portion. Furthermore, in the embodiment, defect feature quantities pertaining to each of the texture features are also acquired from the defect portion texture feature image that is a cutout of the region of the defect candidate from each of the texture feature images $F_j(x, y)$.

At the defect determining step S42, the defect determining unit 48 determines the defect type and the adversity level of each of the defect candidates, based on the defect feature quantities calculated at the defect feature calculating step S41. To determine, a determination rule related to the defect feature quantities, and created by a user (if-then rules or determination tables), a discriminator acquired by what is called machine learning, or combination thereof are used.

As may be clear from the explanation above, in the surface defect inspection apparatus 1 according to one embodiment of the present invention, the texture feature image generating unit 43 generates a plurality of texture feature images by applying a filtering process using a plurality of spatial filters to an input image; the texture feature extracting unit 44 generates a feature vector at each position of the image, by extracting a value at a corresponding position from each of the texture feature images, for each position of the input image; the abnormality level calculating unit 45 generates an abnormality level image representing an abnormality level at each position of the input image, by calculating an abnormality level, for each of the feature vectors, in a multi-dimensional distribution formed by the feature vectors; and the defect candidate detecting unit 46 detects a part having the abnormality level that is higher than a predetermined level in the abnormality level image as a defect portion or a defect candidate portion. In this manner, the sensitivity for a thin and long linear surface defect can be improved, and surface defects can be detected at high sensitivity even when a thin and long linear surface defect and a small and short surface defect are both present.

Examples

Figure 10:
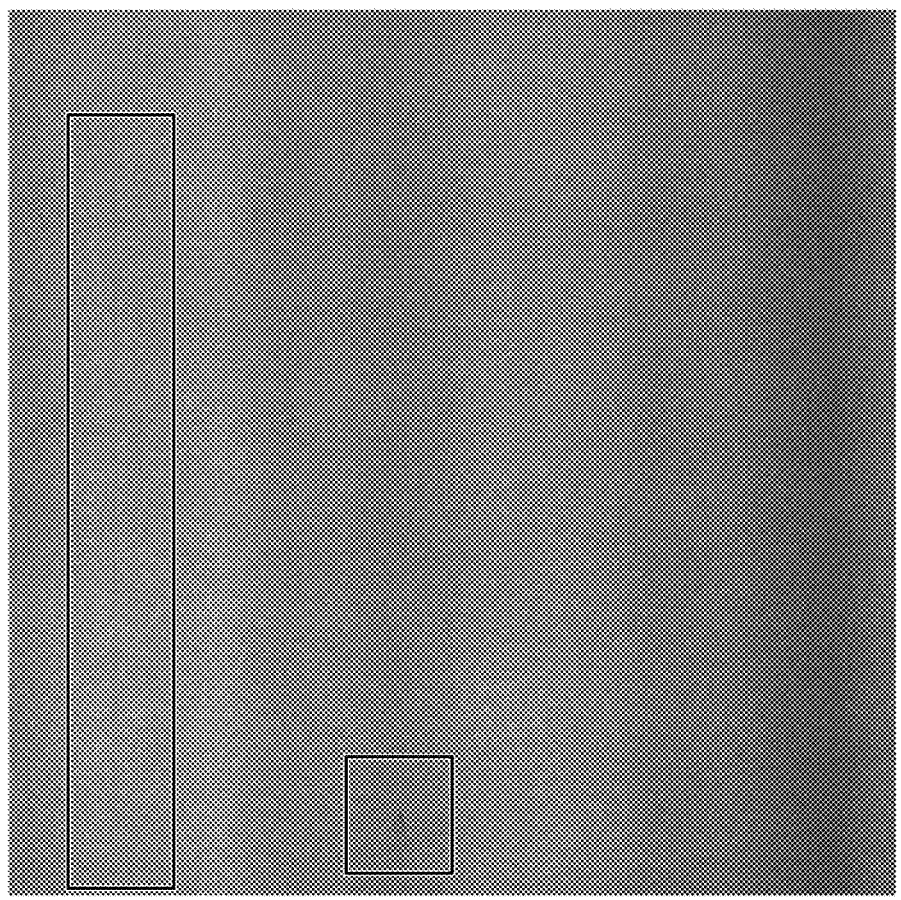
FIG. 10 is a schematic illustrating an example of an image resultant of capturing a steel strip surface.
Figure 11:
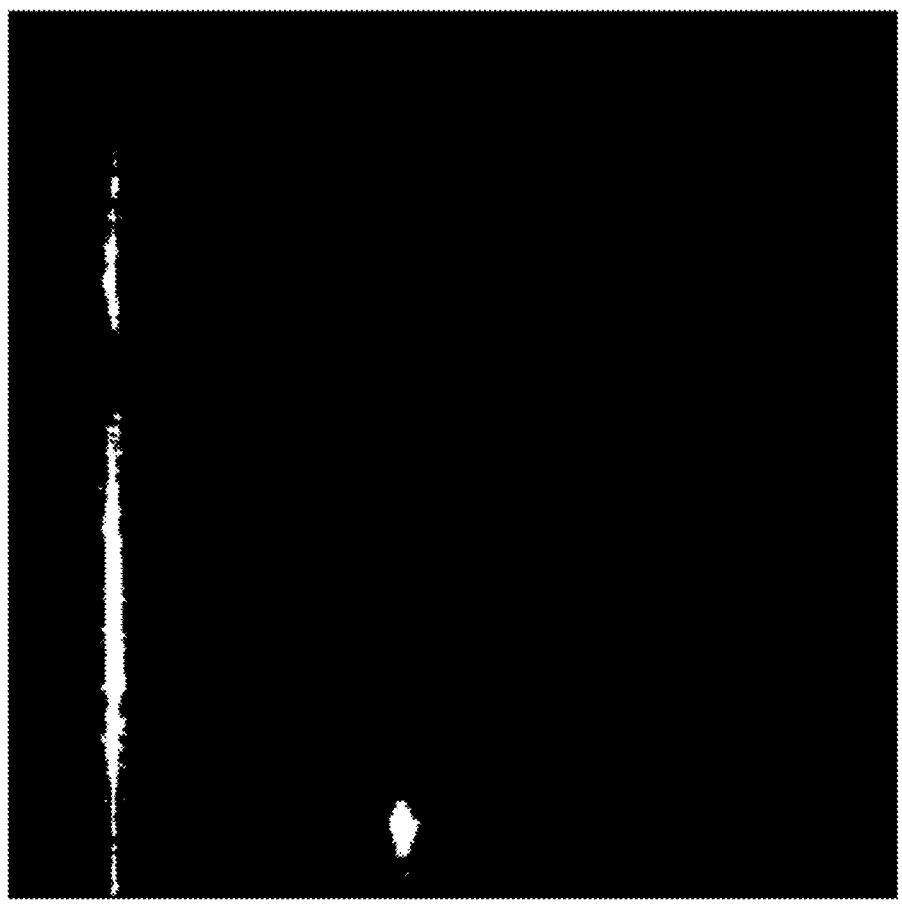
FIG. 11 is a schematic illustrating an example in which the defect detecting process according to an embodiment of the present invention is applied to the image illustrated in FIG. 10.

FIG. 10 represents one example of an image acquired by capturing a surface of a steel strip. In FIG. 10, there were surface defects in the parts surrounded by two rectangles. The surface defect surrounded by the rectangle on the left was a thin and long defect that is difficult to detect, and the surface defect surrounded by the rectangle on the right was a short defect in the longitudinal direction, that is also difficult to detect. The image illustrated in FIG. 10 has 1024 pixels vertically, and 1024 pixel horizontally, and the vertical direction corresponds to the length direction of the steel strip. FIG. 11 illustrates an example of a result of applying the defect detecting process (Step S3) according to an embodiment of the present invention to the image illustrated in FIG. 10. At the texture feature image generating step S31, the expansion process for linear defects was selected, and 64 texture feature images were generated. At the defect candidate detecting step S34, the abnormality level image was binarized using a threshold $D_{thr}$ with $p_{thr}=10^{-10}$, and any defect candidate having an area to be connected smaller than 200 pixels is excluded from the defect candidates. In this example, the attempt for detecting both a thin and long defect and a short defect in the longitudinal direction of the steel strip succeeded, without detecting the steel strip patterns around them erroneously. Furthermore, FIG. 12(c) illustrates an image and a luminance profile across the broken line on the image acquired by detecting the surface defect illustrated in FIG. 12(a) with the defect detecting process (Step 3) according to an embodiment of the present invention. At this time, $P_{thr}=0.0027$. Compared with the result illustrated in FIG. 12(b) achieved with the approach according to Non Patent Literature 1, the sensitivity for the linear defect was improved.

While one embodiment that is one application of the present invention made by the inventors is explained above, the scope of the present invention is not limited to the descriptions and the drawings making up a part of the disclosure of the present invention using the embodiment. In other words, other embodiments, examples, operational technologies, and the like made by any person skilled in the art on the basis of the embodiment, for example, all fall within the scope of the present invention.

According to embodiments of the present invention, it is possible to provide a surface defect inspection method and a surface defect inspection apparatus capable of improving the sensitivity for a thin and long linear surface defect, and of detecting a thin and long linear surface defect and a small and short surface defect even when these surface defects are both present.

REFERENCE SIGNS LIST 1 surface defect inspection apparatus
2 illumination device
3 image capturing device
4 image processing device
5 display device
41 image input unit
42 image correcting unit
43 texture feature image generating unit
44 texture feature extracting unit
45 abnormality level calculating unit
46 defect candidate detecting unit
47 defect feature calculating unit
48 defect determining unit
S steel strip

The invention claimed is:

1. A surface defect inspection method comprising:
an image input step of acquiring an original image by capturing an image of a subject of an inspection;
a texture feature image generating step of generating texture feature images by applying a filtering process using spatial filters to the original image, wherein the texture feature image generating step includes a process of generating an additional texture feature image by applying the filtering process using the spatial filters to an image that is a reduction of the original image or to an image that is a reduction of one of the texture feature images;
a texture feature extracting step of generating a feature vector at each position of the original image, by extracting a value at a corresponding position from each of the texture feature images and the additional texture feature image, for each of the positions of the original image;
an abnormality level calculating step of generating an abnormality level image representing an abnormality level for each position of the original image, by calculating, for each of the feature vectors, an abnormality level in a multi-dimensional distribution formed by the feature vectors; and
a detecting step of detecting a part having the abnormality level that is higher than a predetermined level in the abnormality level image as a defect portion or a defect candidate portion.

2. The surface defect inspection method according to claim 1, wherein a direction for reducing the original image or for reducing the one of the texture feature images includes a direction in parallel with a linear defect that is to be detected.

3. The surface defect inspection method according to claim 2, wherein the spatial filters are achieved by wavelet conversion.

4. The surface defect inspection method according to claim 3, wherein the spatial filters includes a Gabor filter.

5. The surface defect inspection method according to claim 4, wherein Mahalanobis distance is used as an abnormality level in the multi-dimensional distribution formed by the feature vectors.

6. The surface defect inspection method according to claim 3, wherein Mahalanobis distance is used as an abnormality level in the multi-dimensional distribution formed by the feature vectors.

7. The surface defect inspection method according to claim 2, wherein the spatial filters includes a Gabor filter.

8. The surface defect inspection method according to claim 7, wherein Mahalanobis distance is used as an abnormality level in the multi-dimensional distribution formed by the feature vectors.

9. The surface defect inspection method according to claim 2, wherein Mahalanobis distance is used as an abnormality level in the multi-dimensional distribution formed by the feature vectors.

10. The surface defect inspection method according to claim 1, wherein the spatial filters are achieved by wavelet conversion.

11. The surface defect inspection method according to claim 10, wherein the spatial filters includes a Gabor filter.

12. The surface defect inspection method according to claim 11, wherein Mahalanobis distance is used as an abnormality level in the multi-dimensional distribution formed by the feature vectors.

13. The surface defect inspection method according to claim 10, wherein Mahalanobis distance is used as an abnormality level in the multi-dimensional distribution formed by the feature vectors.

14. The surface defect inspection method according to claim 1, wherein the spatial filters includes a Gabor filter.

15. The surface defect inspection method according to claim 14, wherein Mahalanobis distance is used as an abnormality level in the multi-dimensional distribution formed by the feature vectors.

16. The surface defect inspection method according to claim 1, wherein Mahalanobis distance is used as an abnormality level in the multi-dimensional distribution formed by the feature vectors.

17. A surface defect inspection apparatus comprising:
an image capturing unit configured to capture a subject of an inspection;
an image input unit configured to acquire an original image of the subject of the inspection, the original image being captured by the image capturing unit;
a texture feature image generating unit configured to generate texture feature images by applying a filtering process using spatial filters to the original image, wherein the texture feature image generating unit is configured to generate an additional texture feature image by applying the filtering process using the spatial filters to an image that is a reduction of the original image or to an image that is a reduction of one of the texture feature images;
a texture feature extracting unit configured to generate a feature vector at each position of the original image by extracting a value at a corresponding position from each of the texture feature images additional texture feature image, for each of the positions of the original image;
an abnormality level calculating unit configured to generate an abnormality level image representing an abnormality level for each position of the original image, by calculating, for each of the feature vectors, an abnormality level in a multi-dimensional distribution formed by the feature vectors; and
a detecting unit configured to detect a part having the abnormality level that is higher than a predetermined level in the abnormality level image as a defect portion or a defect candidate portion.

* * * * *